US006929291B2

(12) United States Patent
Chen

(10) Patent No.: US 6,929,291 B2
(45) Date of Patent: Aug. 16, 2005

(54) MAGNETIC LOCK

(75) Inventor: Hsiang Chen, Taipei (TW)

(73) Assignee: Inventec Corp., Taipei (TW)

( * ) Notice: Subject to any disclaimer, the term of this patent is extended or adjusted under 35 U.S.C. 154(b) by 70 days.

(21) Appl. No.: 10/627,819

(22) Filed: Jul. 28, 2003

(65) Prior Publication Data

US 2005/0023841 A1 Feb. 3, 2005

(51) Int. Cl.[7] .............................................. E05C 17/56
(52) U.S. Cl. ................................ 292/251.5; 312/223.2; 361/732
(58) Field of Search ............... 292/1, 251.5; 312/223.2; 361/732, 740, 747

(56) References Cited

U.S. PATENT DOCUMENTS

| | | | | |
|---|---|---|---|---|
| 2,797,655 A | * | 7/1957 | Morehouse | 109/63.5 |
| 3,596,958 A | * | 8/1971 | Bowerman | 292/201 |
| 3,790,197 A | * | 2/1974 | Parker | 292/251.5 |
| 6,653,919 B2 | * | 11/2003 | Shih-Chung et al. | 335/207 |

* cited by examiner

Primary Examiner—Gary Estremsky
(74) Attorney, Agent, or Firm—Bacon & Thomas, PLLC

(57) ABSTRACT

The present invention is to provide a magnetic lock mountable on an electronic device, which comprises an upper and a lower magnetic plates respectively formed on an upper and a lower housings of the electronic device, enabling the electronic device to be automatically locked due to the attraction between a plurality of magnetic members disposed on the corresponding positions of the upper and lower magnetic plates having different polarities when the upper housing is covered the lower housing. Alternatively, when the upper magnetic plate is moved a predetermined distance, the corresponding magnetic members on the upper and lower magnetic plates are in turn having the same polarity to repel with each other, enabling the upper and lower housings of the electronic device to be automatically unlocked.

4 Claims, 5 Drawing Sheets

MAGNETIC LOCK

FIELD OF THE INVENTION

The present invention relates to locks and more particularly to a magnetic lock having a particular application in electronic device.

BACKGROUND OF THE INVENTION

A variety of electronic and information products are developed due to the fast progress in electronics and computer technology. Correspondingly, more and more users become more critical with respect to the functions and the quality of the products. The increasing consumer demand with respect to manufacturers of portable computer, particularly notebook computer, is very significant.

The trend of developing notebook computers is slimness, compactness, and lightweight in consideration of weight and size. Moreover, an all-in-one notebook computer is constantly being sought. Nowadays, all-in-one notebook computers are dominant type of portable computers. It is understood that the notebook computer market is very competitive. Fortunately, a wide variety of notebook computers are available for consumers to choose. It also understood that most consumers want to buy an all-in-one, ergonomic notebook computer in a cost effective price. It is concluded that if a notebook computer manufacturer wants to win over other competitive manufacturers how to provide user with ergonomic notebook computers in a reasonable price should be a deciding factor.

A notebook computer, as self-explanatory, means the computer can be easily opened or closed just like opening or closing a notebook. As shown in FIG. 1, a prior parallelepiped notebook computer comprises a display 10 and a case 11. At least one hinge 12, provided at one side of the case 11, is coupled to the display 10. As such, in a nonoperating position the display 10 is covered the case 11. For using the notebook computer, a user can pivot the display 10 about the hinge 12 upward to position the display 10 at an optimum angle about the case 11 for viewing. A keyboard 13 and a touch panel 14 are provided on top of the case 11 proximate the display 10. Also, two spaced slots 15 are formed at a top edge of the case 11 distal from the display 10. A slide lock 16 is provided on one side of the display 10 distal from the hinge 12. The lock 16 is adapted to prevent the notebook computer from opening. For locking the notebook computer, slide the lock 16 to cause two hooks 161 at both sides of the lock 16 to move laterally. The lateral movements of the hooks 161 will cause the hooks 161 to insert into the slots 15 for fastening the display 10 and the case 11 together (i.e., locked) in response to closing the display 10 onto the case 11.

However, a precise manufacturing of a connecting mechanism of the slide lock 16 and the hooks 161 is required since newly developed notebook computers are more lightweight and more compact. As a result, a user may have difficulty in feeling whether the hooks 161 are disengaged from the slots 15 in opening the display 10 since the lateral movement of the lock 16 is relatively small. It is typical that a user uses one hand to push the lock 16 and the other hand to open the display 10. However, the user has to exert a great force to open the display 10 due to the own weight of the display 10. Hence, it is not easy to open the display 10. It is often that a user may use a great force to open the display 10 not being aware that the hooks 161 are not disengaged from the slots 15. As a result, the lock 16, the hooks 161, and other associated members are susceptible of damage. Further, a great inconvenience and trouble may be brought to users.

Moreover, the protruding hooks 161 are not aesthetic in addition to the above drawback of being susceptible of damage. It is concluded that the prior lock is not a perfect design.

Thus, it is desirable among vast users and manufacturers to provide a notebook computer having a novel lock capable of easily, conveniently opening the display 10 from the case 11 or closing the display 10 onto the case 11.

SUMMARY OF THE INVENTION

A primary object of the present invention is to provide a magnetic lock mountable on an electronic device capable of opening or closing. The magnetic lock comprises an upper magnetic plate formed on an upper housing of the electronic device and a lower magnetic plate formed on a lower housing of the electronic device. The electronic device is automatically locked because magnetic members of the upper magnetic plate attract magnetic members of the lower magnetic plate having a polarity different from that of the magnetic members of the upper magnetic plate when the upper housing is covered the lower housing. Alternatively, a user can move the upper magnetic plate about the lower magnetic plate a predetermined distance to repel the magnetic members of the upper magnetic plate from the magnetic members of the lower magnetic plate having the same polarity as that of the magnetic members of the upper magnetic plate to unlock the electronic device. By utilizing the present invention, the above drawbacks of the prior art can be overcome. These drawbacks are that the protruding hooks are not aesthetic, it is not easy to open the display for unlocking the notebook computer, and it is often that a user may use a great force to open the display not being aware that the hooks are not disengaged from the slots, resulting in a great possibility of easily damaging the slide lock, the hooks, and other associated. The magnetic lock of the present invention also has the following advantages. It can be realized in a simple construction, simple manufacturing, and low cost. Further, the magnetic lock of the present invention is compact, simple and easy in operation, and ergonomic.

The above and other objects, features and advantages of the present invention will become apparent from the following detailed description taken with the accompanying drawings.

DETAILED DESCRIPTION OF THE PREFERRED EMBODIMENTS

Figure 1:
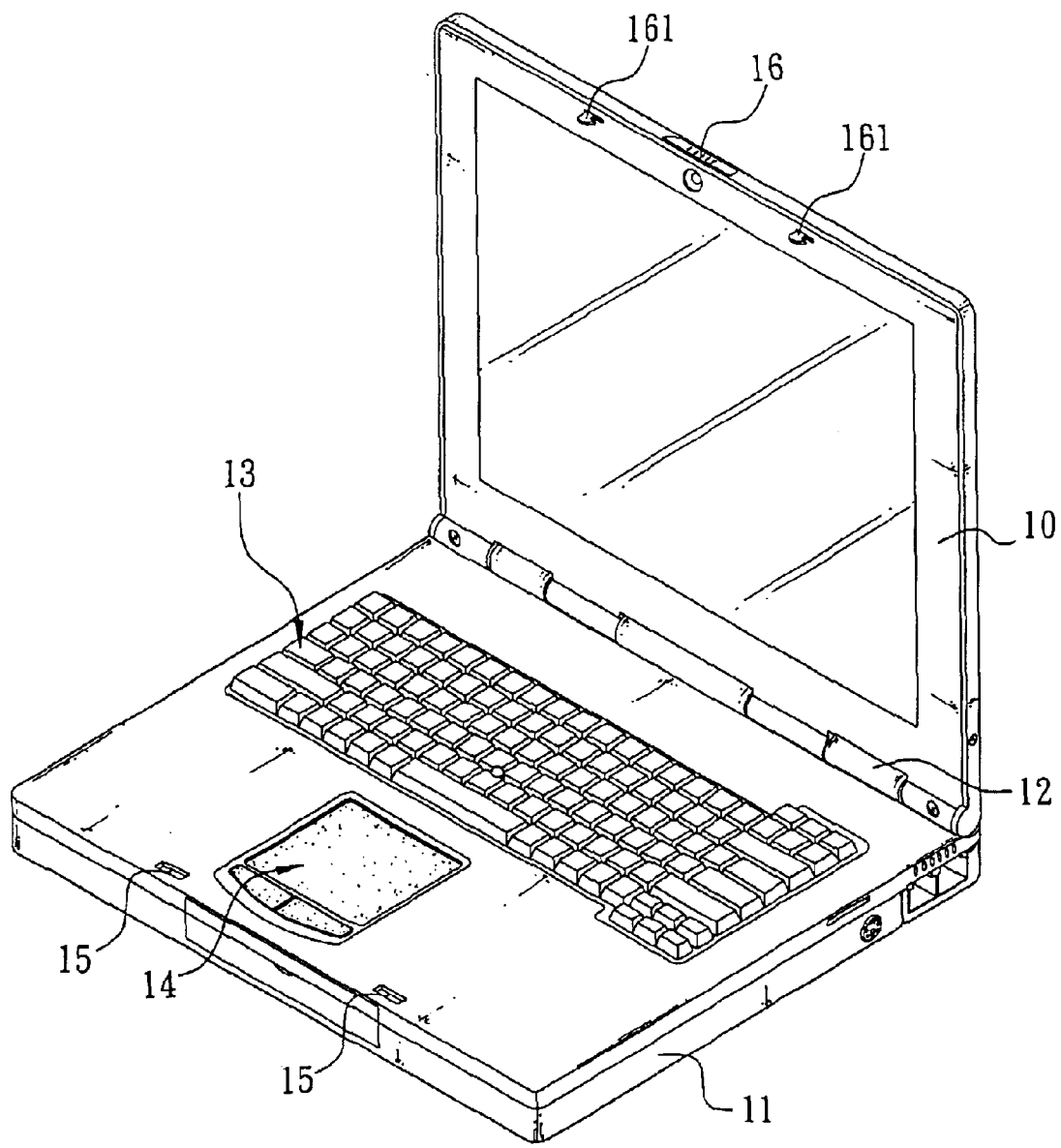
FIG. 1 is a perspective view of a notebook computer incorporating conventional slide lock and associated hooks.
Figure 2:
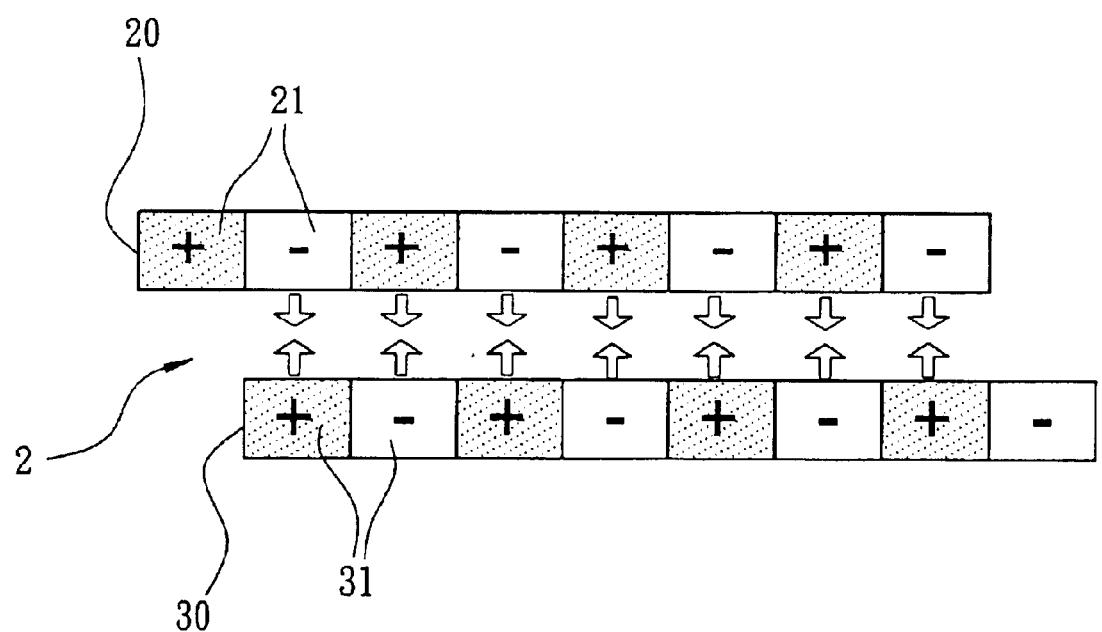
FIG. 2 is a diagram schematically illustrating a magnetic lock according to a first preferred embodiment of the invention.

Referring to FIG. 2, there is shown a magnetic lock 2 in accordance with a first preferred embodiment of the invention. The magnetic lock is adapted to mount on an electronic device (e.g., notebook computer, palm computer, or the like) capable of opening or closing. The magnetic lock 2 comprises an elongate, rectangular upper magnetic plate 20 and an elongate, rectangular lower magnetic plate 30. The upper magnetic plate 20 comprises a plurality of alternate magnetic members 21 of positive polarity (+) and magnetic members 21 of negative polarity (−) from one end to the other end. Each of the magnetic members 21 of positive polarity (+) and the magnetic members 21 of negative polarity (−) is formed of a magnetic pad 21 in this embodiment. As shown in FIG. 2, similar to the upper magnetic plate 20, the lower magnetic plate 30 comprises a plurality of alternate magnetic members 31 of positive polarity (+) and magnetic members 31 of negative polarity (−) from one end to the other end. Each of the magnetic members 31 of positive polarity (+) and the magnetic members 31 of negative polarity (−) is formed of a magnetic pad 31 in the embodiment. It is appreciated by those skilled in the art that the magnetic pads 21 and 31 may be replaced by members formed of similar materials in other embodiments without departing from the scope and spirit of the invention.

Figure 3:
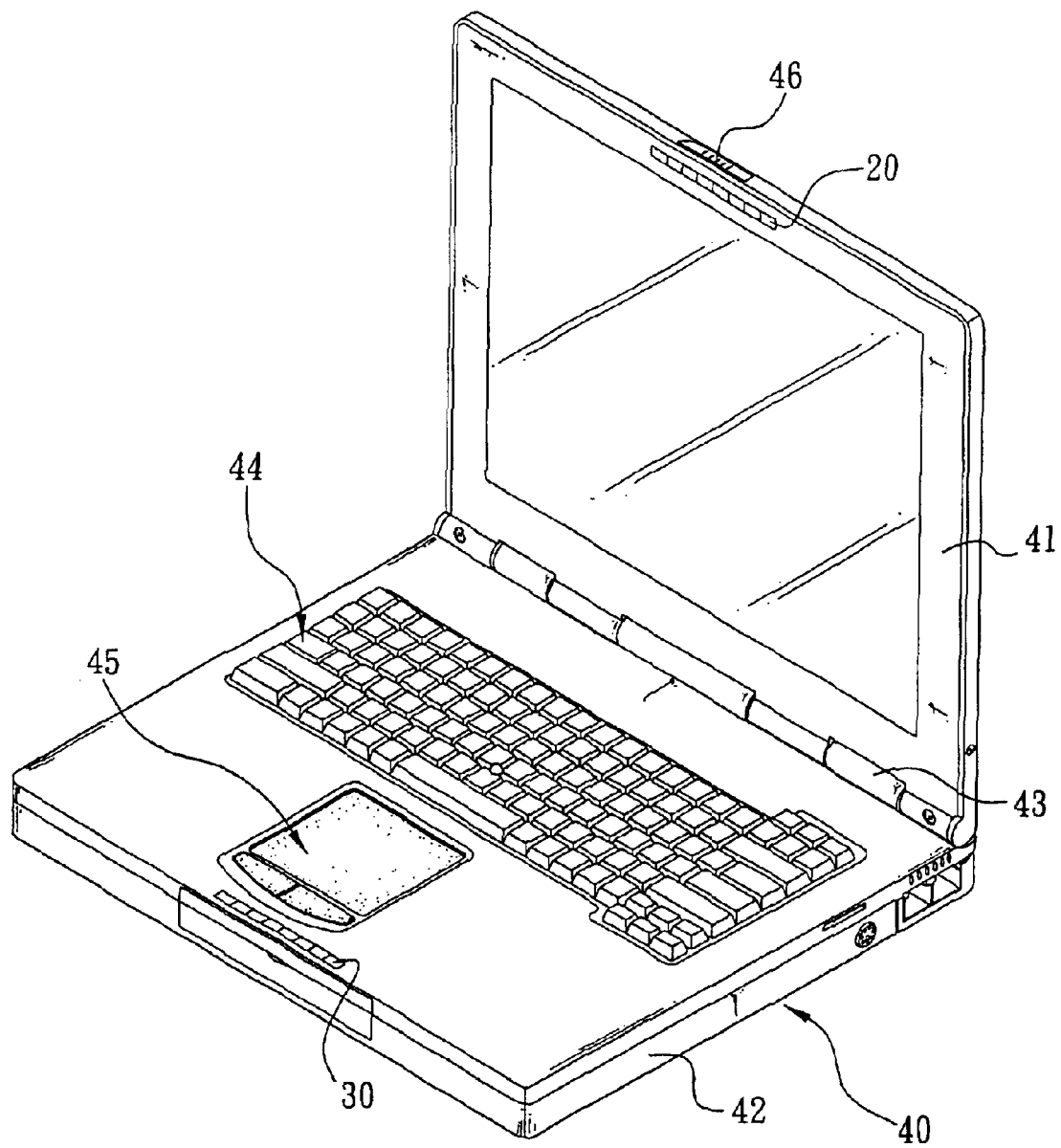
FIG. 3 is a perspective view of a notebook computer incorporating the magnetic lock.
Figure 4:
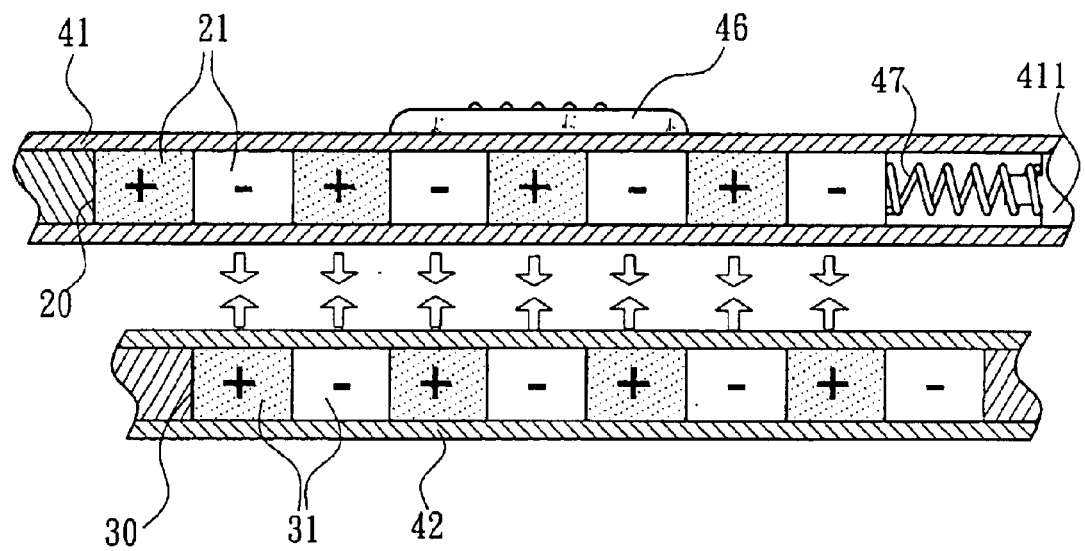
FIG. 4 is a diagram schematically illustrating attracting force between an upper magnetic plate and a lower magnetic plate of the magnetic lock.

As stated above, the magnetic lock 2 is adapted to mount on an electronic device capable of opening or closing. Thus, following description will be made with respect to the magnetic lock 2 mounted on a notebook computer 40. Referring to FIG. 3, the notebook computer 40 is substantially the same as a typical one. The parallelepiped notebook computer 40 comprises a display 41 and a case 42. At least one hinge 43, provided at one side of the case 42, is coupled to the display 41. As such, the display 41 is able to pivot about the hinge 43 to open or close the notebook computer 40. A keyboard 44 and a touch panel 45 are provided on top of the case 42. A slide lock 46 is provided on one side of the display 41 distal from the hinge 43. The upper magnetic plate 20 is able to engage with the lower magnetic plate 30 when the display 41 is covered the case 42 by pivoting (see FIG. 2). The upper magnetic plate 20 is adjacent the slide lock 46 on the display 41 (see FIG. 3). As shown in FIG. 4, the other end of the upper magnetic plate 20 is coupled to one end of an elastic element (e.g., spring) 47 which has the other end anchored at an interior wall 411 of the display 41.

By configuring the magnetic lock 2 as above, referring to FIGS. 3 and 4 again, the display 41 is covered the case 42 by pivoting. It is clearly seen that the magnetic pads 21 will attract the magnetic pads 31 if they are different in polarity (i.e., the magnetic pads 21 of positive polarity (+) attract the magnetic pads 31 of negative polarity (−) and the magnetic pads 21 of negative polarity (−) attract the magnetic pads 31 of positive polarity (+) respectively) due to magnetism. As a result, the notebook computer 40 is locked because the display 41 and the case 42 are fastened together.

Figure 5:
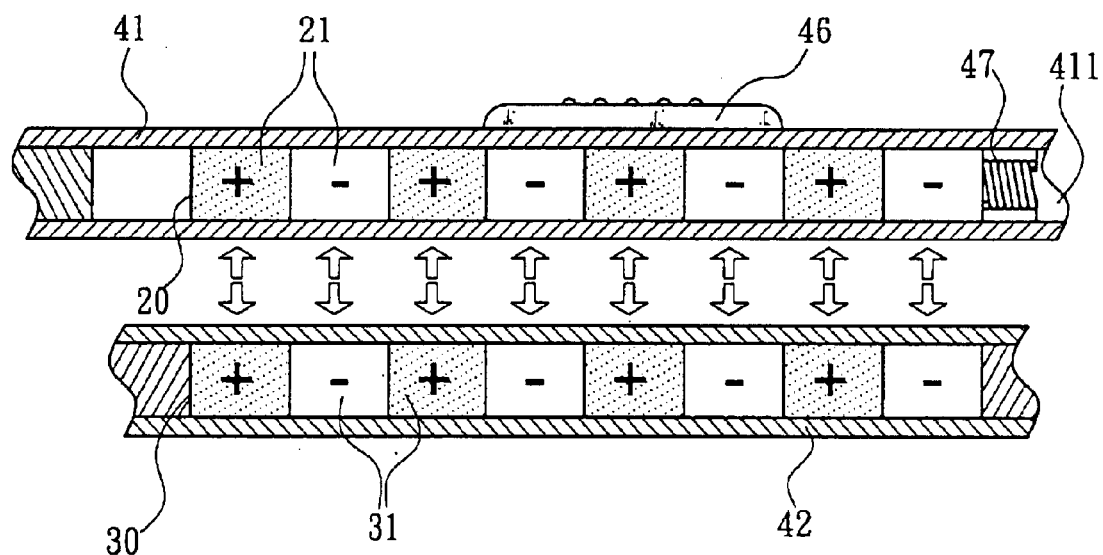
FIG. 5 is a diagram schematically illustrating repelling force between an upper magnetic plate and a lower magnetic plate of the magnetic lock.

Referring to FIGS. 3 and 5, to the contrary, in a case of opening the notebook computer 40 by pushing the lock 46 toward the elastic element 47 for compression, the upper magnetic plate 20 moves laterally a distance. The magnetic pads 21 will also move. As such, the magnetic pads 21 of one polarity are aligned with the magnetic pads 31 of the same polarity (i.e., the magnetic pads 21 of positive polarity (+) are aligned with the magnetic pads 31 of positive polarity (+) and the magnetic pads 21 of negative polarity (−) are aligned with the magnetic pads 31 of negative polarity (−) respectively) if the moving distance of the upper magnetic plate 20 is sufficient. In this position, the upper magnetic plate 20 will repel the lower magnetic plate 30 (i.e., the magnetic pads 21 of positive polarity (+) repel the magnetic pads 31 of positive polarity (+) and the magnetic pads 21 of negative polarity (−) repel the magnetic pads 31 of negative polarity (−) respectively) due to magnetism. As a result, the repelling force between the display 41 and the case 42 will form a gap therebetween. As such, a user can quickly pivot the display 41 upward by inserting finger(s) into the gap. Moreover, the upper magnetic plate 20 will be pushed back to its original position immediately thereafter by the expansion of the elastic element 47 coupled to the other end of the upper magnetic plate 20 once the pushing force exerted on the lock 46 is released. This is done due to the elasticity of the elastic element 47. Thus, the upper magnetic plate 20 and the lower magnetic plate 30 will attract again for locking the notebook computer 40 if they are engaged again when the display 41 is covered the case 42 (see FIG. 4).

Figure 6:
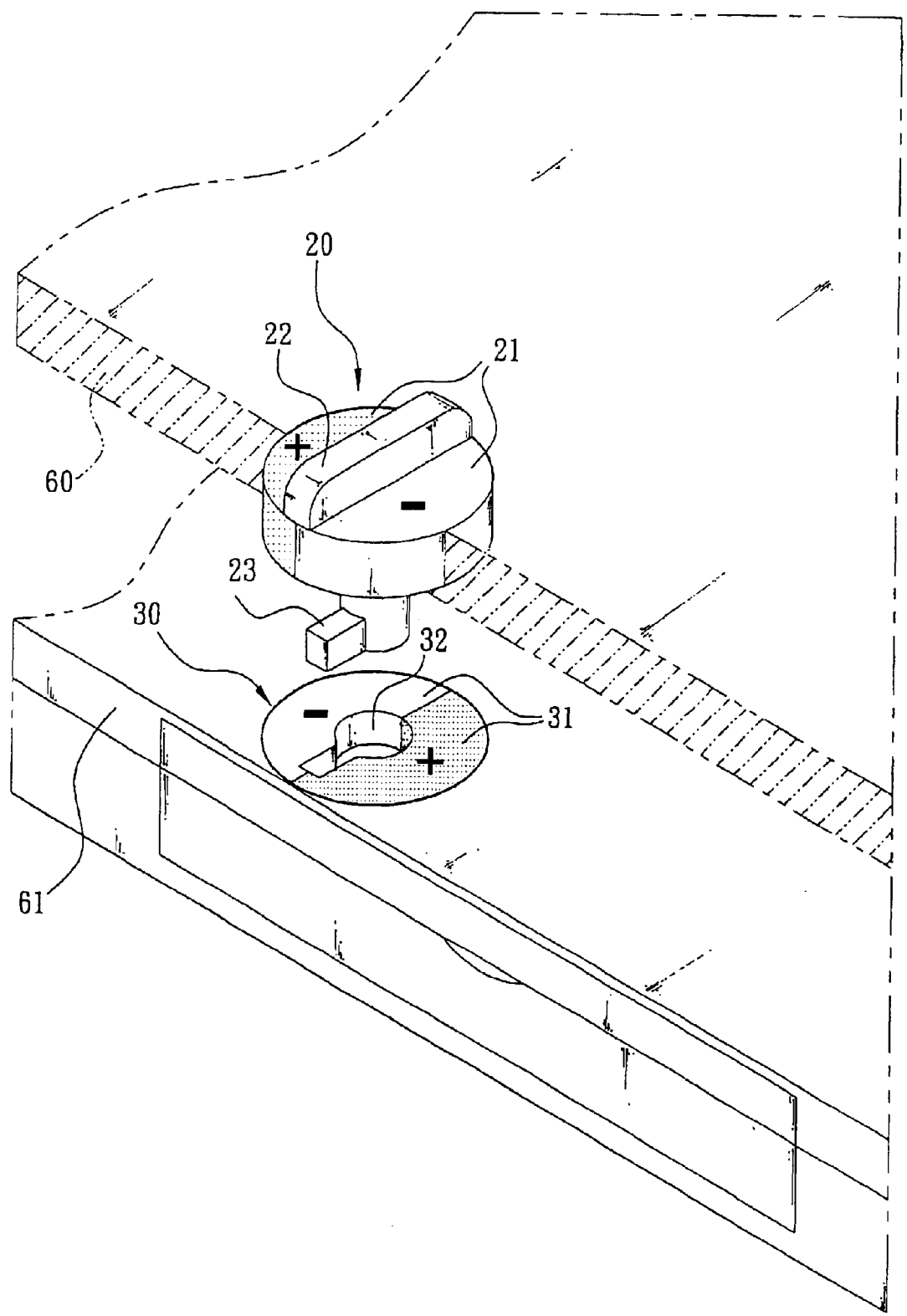
FIG. 6 is a perspective view of a notebook computer incorporating a magnetic lock according to a second preferred embodiment of the invention.

The magnetic lock 2 of the invention is made possible by utilizing magnetism. That is, two magnetic members having different polarities will attract each other and to the contrary, two members having the same polarity will repel each other. As such, a device can be locked or unlocked by incorporating the above magnetic members. Further, the magnetic lock 2 can be implemented is one of a variety of forms. Referring to FIG. 6, the upper magnetic plate 20 is implemented as a disc comprising a top ridge 22 across its center so as to form a magnetic pad 21 of positive polarity (+) at one half and a magnetic pad 21 of negative polarity (−) at the other half. The upper magnetic plate 20 further comprises a tab 23 extended downward from its bottom. Also, the upper magnetic plate 20 is rotatable about the tab 23. The lower magnetic plate 30 is disposed corresponding to the upper magnetic plate 20 and is implemented as a circular one. The lower magnetic plate 30 comprises a hole 32 through its center, the hole 32 being conformed to receive the tab 23, a magnetic pad 31 of negative polarity (−) at one half, and a magnetic pad 31 of positive polarity (+) at the other half. In a case of closing a device, the tab 23 will insert into the hole 32 as an upper case 60 of the device is engaged with a lower case 61 of the device by pivoting. At this position, the upper magnetic plate 20 formed on the upper case 60 and the lower magnetic plate 30 formed on the lower case 61 are coupled together in which the magnetic pad 21 of positive polarity (+) attracts the magnetic pad 31 of negative polarity (−) and the magnetic pad 21 of negative polarity (−) attracts the magnetic pad 31 of positive polarity (+) respectively due to magnetism. As a result, the device is locked because the upper case 60 and the lower case 61 are fastened together.

To the contrary, for opening the device it is possible of rotating the upper magnetic plate 20 180 degrees about the tab 23 which, as stated above, is fastened in the hole 32. Once the magnetic pad 21 of one polarity is aligned with the magnetic pad 31 of the same polarity by the above rotation (i.e., the magnetic pad 21 of positive polarity (+) is aligned with the magnetic pad 31 of positive polarity (+) and the magnetic pad 21 of negative polarity (−) is aligned with the magnetic pad 31 of negative polarity (−) respectively) the upper case 60 will repel the lower case 61 (i.e., the magnetic pad 21 of positive polarity (+) repels the magnetic pad 31 of positive polarity (+) and the magnetic pad 21 of negative polarity (−) repels the magnetic pad 31 of negative polarity (−) respectively) due to magnetism. As a result, the repelling force between the upper case 60 and the lower case 61 will form a gap therebetween. As such, a user can quickly pivot the upper case 60 upward for opening the device by inserting finger(s) into the gap.

It will be evident from the foregoing that the magnetic lock 2 of the invention has the following advantages: It can be realized in a simple construction, simple manufacturing, and low cost. Further, the magnetic lock 2 of the invention is compact, simple and easy in operation, and ergonomic.

While the invention has been described by means of specific embodiments, numerous modifications and variations could be made thereto by those skilled in the art without departing from the scope and spirit of the invention set forth in the claims.

What is claimed is:

1. A magnetic lock mountable on an electronic device capable of opening or closing, the magnetic lock comprising:
   a disc shaped, rotatable upper magnetic plate comprising a magnetic member of positive polarity at one half and a magnetic member of negative polarity at the other half; and
   a circular lower magnetic plate comprising a magnetic member of positive polarity at one half and a magnetic member of negative polarity at the other half, and
   wherein the upper magnetic plate is formed on an upper housing of the electronic device and the lower magnetic plate is formed on a lower housing of the electronic device so that covering the upper housing on the lower housing will attract the magnetic members of the upper magnetic plate and the magnetic members of the lower magnetic plate having a polarity different from that of the magnetic members of the upper magnetic plate together due to magnetism, thereby fastening the upper and the lower housings together for locking the electronic device; or rotating the upper magnetic plate about 180 degrees will move the magnetic members of the upper magnetic plate with respect to the magnetic members of the lower magnetic plate about 180 degrees to repel the magnetic members of the upper magnetic plate from the magnetic members of the lower magnetic plate having the same polarity as that of the magnetic members of the upper magnetic plate due to magnetism, thereby forming a gap between the upper and the lower housings prior to unlocking the electronic device.

2. The magnetic lock of claim 1, wherein the upper magnetic plate further comprises a tab extended downward from its bottom and the lower magnetic plate further comprises a hole through its center, the hole being conformed to fitly receive the tab so that insertion of the tab into the hole will attract the magnetic members of the upper magnetic plate and the magnetic members of the lower magnetic plate having a polarity different from that of the magnetic members of the upper magnetic plate together due to magnetism, thereby fastening the upper and the lower housings together for locking the electronic device.

3. The magnetic lock of claim 2, wherein rotating the upper magnetic plate with respect to the lower magnetic plate about 180 degrees with the tab fastened in the hole will move the magnetic members of the upper magnetic plate with respect to the magnetic members of the lower magnetic plate about 180 degrees to repel the magnetic members of the upper magnetic plate from the magnetic members of the lower magnetic plate having the same polarity as that of the magnetic members of the upper magnetic plate due to magnetism, thereby forming a gap between the upper and the lower housings prior to unlocking the electronic device.

4. The magnetic lock of claim 1, wherein each of the magnetic members is formed of a magnetic pad.

* * * * *